United States Patent [19]
Zolliker et al.

[11] Patent Number: 6,072,604
[45] Date of Patent: *Jun. 6, 2000

[54] METHOD FOR CALIBRATING A PHOTOGRAPHIC COPY PRINTER

[75] Inventors: Peter Zolliker, Dielsdorf; Walter Kraft, Zürich; Rudolf Wacker, Rombach, all of Switzerland

[73] Assignee: Gretag Imaging AG, Regensdorf, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,307

[22] Filed: Jul. 30, 1997

[51] Int. Cl.$^7$ ....................................................... G03F 3/10
[52] U.S. Cl. ............................................................ 358/527
[58] Field of Search ..................... 358/527, 504, 358/509, 76, 296, 500, 518, 530, 534, 501, 406, 466, 26, 124, 131; 355/124; 395/131

[56] References Cited

U.S. PATENT DOCUMENTS

| | | | |
|---|---|---|---|
| 4,335,956 | 6/1982 | Findeis et al. | 355/27 |
| 4,893,178 | 1/1990 | Matama | 358/76 |
| 5,218,671 | 6/1993 | Liao et al. | 395/131 |
| 5,264,946 | 11/1993 | Takakura | 358/466 |
| 5,333,069 | 7/1994 | Spence | 358/517 |
| 5,345,315 | 9/1994 | Shalit | 358/406 |
| 5,953,136 | 9/1999 | Kraft et al. | 358/504 |

FOREIGN PATENT DOCUMENTS

| | | | |
|---|---|---|---|
| 0 475 897A1 | 9/1991 | European Pat. Off. | G03B 27/73 |
| 0 586 773A1 | 9/1991 | European Pat. Off. | G03B 27/73 |
| 5-316351 | 11/1993 | Japan | H04N 1/40 |

OTHER PUBLICATIONS

Practical Methods Of Optimization, R. Fletcher, vol. 1, Unconstrained Optimization, John Wiley & Sons, 1980, Table of Contents only.

Practical Methods Of Optimization, R. Fletcher, vol. 2, Unconstrained Optimization, John Wiley & Sons, 1981, Table of Contents only.

*Primary Examiner*—Joseph Mancuso
*Assistant Examiner*—Paul H. Schirduan
*Attorney, Agent, or Firm*—Burns, Doane, Swecker & Mathis, LLP

[57] ABSTRACT

In a method for calibrating a photographic copy printer, developed copies are scanned regionally (such as dotwise), and the measured light transmitted or remitted by each scanned region of the copying material is supplied to a detector array, broken down spectrally, and converted into wavelength- and intensity-dependent measurement data. The electrical measurement signals are digitized, and with their aid, copy-specific measurement data are ascertained. On the basis of the copy-specific measurement data, the original-specific measurement data, and the exposure used in the copying, a model of the original adapted to the copy material and a model for the copy material, or the model (Pi) inverse to it, which forms the basis for calculating the requisite amounts of copying light, are checked with respect to specifiable accuracy criteria and optimized as needed.

13 Claims, 6 Drawing Sheets

METHOD FOR CALIBRATING A PHOTOGRAPHIC COPY PRINTER

BACKGROUND OF THE INVENTION

1. Field of the Invention

The invention relates to a method for calibrating a photographic copy printer.

2. State of the Art

Numerous copying methods are known. Most often, this involves the picture fields of a negative film being exposed to light and copied to photo paper. Hereinafter, for the sake of simplicity, reference will be made to negative films and photo paper. The negative films or picture fields on the negative films are representative of original material or, in general, originals to be copied (including slides), and the photo paper or paper pictures are representative of the copy material or copies (including, sheets).

Because normally standardized, uniform amounts of copying light cannot be practically used in copying equipment, the picture fields of the negative fields of the negative films are analyzed. Typically, this is done such that in a measuring station of the copy printer, first the picture field of the negative film to be copied is scanned regionally, (for example, dotwise) with the aid of measurement light. The measurement light transmitted or remitted from each scanned region of a picture field of the negative film is transmitted to a detector array, broken down spectrally, and converted into wavelength- and intensity-dependent electrical measurement signals. The electrical measurement signals are then digitized, and with their aid, picture field-specific measurement data are ascertained. With the aid of the measurement data acquired, requisite amounts of copying light are then ascertained.

For the requisite amounts of copying light in the various colors (blue, green, red) to be ascertained correctly, the manner in which a certain photo paper responds to changes in the various colors of the copying light must be known. That is, changes in the paper density (via the concentration of the pigments yellow, magenta and cyan) as a function of a change in the copying light in the colors blue, green, red must be known. A model for the photo paper—a paper model—must therefore be known which is representative for the absorption properties of the photo paper upon a change in the exposure (including the secondary absorptions of the photo paper; for example, if the photo paper is exposed to blue light, this causes a change in the optical densities in all three colors).

In addition to knowing a paper model, the manner in which the photo paper reacts to changes in the spectral film density must be known. That is, the manner in which the copying light (exposure) has to be changed to compensate for deviations in the actually measured density of a negative from the average film density (or in other words the deviation from the "standard") must be known. Because the film must be viewed "with the eyes of the photo paper", this involves a paper-related film model.

Once the paper-related film model has been optimally setup-tested, all negative picture fields can be copied to a uniform gray with the aid of this model and with the aid of the measurement data of the respective negative picture field. This copying can be achieved with great accuracy, in the case of negative picture fields in which each one has been exposed homogeneously per se but each negative picture field has a different density from the others. Such accuracy is possible, regardless of the particular film type, and regardless of the particular density of the individual negative picture fields. With the aid of the paper model, once it has been tested, it is possible to predict what change in the copying light in the particular color (blue, green, red) is needed to achieve a certain change in paper density (in yellow, magenta, cyan).

With a copy printer which, in operation, is setup-tested as far as possible (that is, calibrated) with the aid of the ascertained measurement data of the respective negative picture field, and with the aid of the paper-related film model, the amounts of copying light required for the incident exposure are ascertained. The paper model or the inverse paper model is used only in the case of a second pass; namely, whenever the corrections entered by the operating staff have to be converted to exposure corrections. On the basis of the amounts of copying light ascertained, corresponding control signals are ascertained for color filters and shutters provided in the copying station of the copy printer which, in accordance with the control signals, are placed in the copying beam path when the negative picture field is copied onto the photo paper. Once the copying of the negative picture field onto the photo paper has been completed, the copies produced are developed in a developing station which need not necessarily, but which may be, an integral component of the copy printer.

The above-described method is functionally reliable and performs well. However, with the method described above, the setup test or calibration of the copy printer is done using quite a large number of special test negative picture fields. Although these special test negative picture fields are indeed exposed homogeneously, (taken each on its own), they are exposed differently in comparison with the other test negative picture fields. Many different film types are used, since the various film types have different spectral density courses, which must be balanced out by the copy printer in copying. These different test negative picture fields are copied onto photo paper before the production process begins, and then are developed and finally measured by densitometry. From the developed test copies, the operating staff can then determine whether the copy printer has been optimally setup-tested (that is, calibrated). If this is not the case, then the calibration is corrected, on the basis of the measured data of the paper and film, and on the basis of the memorized exposure values. For example, for subtesting of the paper-related film model, a test roll of film is used, with about 10 different film types and 100 negative picture fields.

While this expenditure is still acceptable for a high capacity printer, such effort and expense are no longer acceptable for setup testing in minilabs. It is also disadvantageous that once the copy printer has been setup tested (the first thing every day, for instance), no ongoing monitoring of the copy printer settings (and hence the settings for the two models) is performed. At best, the operating staff performs sporadic monitoring by making random checks of the production paper pictures or by regularly producing and assessing test pictures.

SUMMARY OF THE INVENTION

The present invention is therefore directed to a method for calibration in which, on the one hand, the optimization of the models is accomplished with as little effort as possible. On the other hand, ongoing automatic monitoring and tracking of the settings of the copy printer (and hence of the two models) can be achieved.

According to exemplary embodiments, developed copies (paper pictures) are scanned regionally, for example, dotwise. Although this can be done with the aid of test negative picture fields, it can also be done during production (that is, no test negatives are used but rather negative picture fields that are to be copied are used).

The measured light transmitted or remitted by each scanned region of the copy material (photo paper) is delivered to a detector array, broken down spectrally, and converted into wavelength- and intensity-dependent electrical measurement signals. These electrical measurement signals are digitized, and with their aid, copy-specific (paper picture-specific) measurement data are ascertained. On the basis of these copy-specific (paper picture-specific) measurement data and on the basis of the known measurement data of the associated original to be copied (that is, the already available measurement data from the associated negative picture field, and on the basis of the exposure values used in the copying), the model of the original (paper-related film model) adapted to the copying material (photo paper) and the model for the copying material (paper model), or the inverse paper model, are checked for specifiable accuracy criteria and optimized if needed. As in the use of production pictures to optimize the models, the association of the measured points on the respective paper picture with the corresponding measured points on the associated negative of the film is done, and the various film types can be taken into account.

This process is less complicated, because no test negatives are used, and because it enables automatic monitoring and/or tracking of the setting of the copy printer (paper model and paper-related film model). Multiple variants can of course be implemented. For example, in a first variant, the data can be collected during operation (for instance with a "sliding window": old data are forgotten), and reoptimization can be performed only on demand by the operating staff. In a second exemplary variant, the data are collected during operation, and reoptimization is done each time the copy printer is started up. In a third variant, the tracking or optimizing is done continuously while the data are occurring (invisibly to the operating staff).

According to one exemplary method of the invention, both the model, adapted to the copy material for the original (paper-related film model), and the paper model for the copy material (or inverse paper model), are iteratively optimized on the basis of the copy-specific (paper picture-specific) measurement data, and naturally on the basis of the original-specific (picture field-specific) measurement data, which of course are available from the spectral measurement of the original (negative film). Iterative optimization can be performed until the criterion for accuracy for the respective model (such as the mean square error), is minimized or undershoots a specifiable threshold value. The iterative optimization of the respective model can be effected such that the other model is unchanged.

Another exemplary method is distinguished in that the measurement signals, resulting from the spectral measurement of the original and then digitized, are subjected to a reversible (for example, orthogonal) transformation or data compression, such as the Karhunen-Loève transformation, and that the transformation coefficients resulting from this transformation form the measurement data for the respective original and are used as the input variable for the model, adapted to the copy material, of the original (see, for example, European Patent Disclosure EP-A 0 475 897). This method can also involve a further development of the exemplary iterative method. However, the densities in the basic colors of red, green and blue, of the kind ascertained with the aid of conventional scanners, for instance, are also suitable as an input variable for the model of the original adapted to the copy material.

In a further development of the two exemplary variants described above, first a starting value for the paper-related film model is determined. Then, on the basis of copy-specific (paper picture-specific) measurement data and the exposure values used in copying, as well as on the basis of the original-specific measurement data, the model for the copy material (paper model) or the inverse paper model can be optimized until such time as the mean square error is minimized or undershoots the specifiable threshold value. Then, with an optimized paper model or an optimized inverse paper model, the paper-related film model is updated, on the basis of the copy-specific (paper picture-specific) measurement data and the exposure values used as well as on the basis of the original-specific measurement data, until such time as the mean square error is minimized or undershoots the specifiable threshold value.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
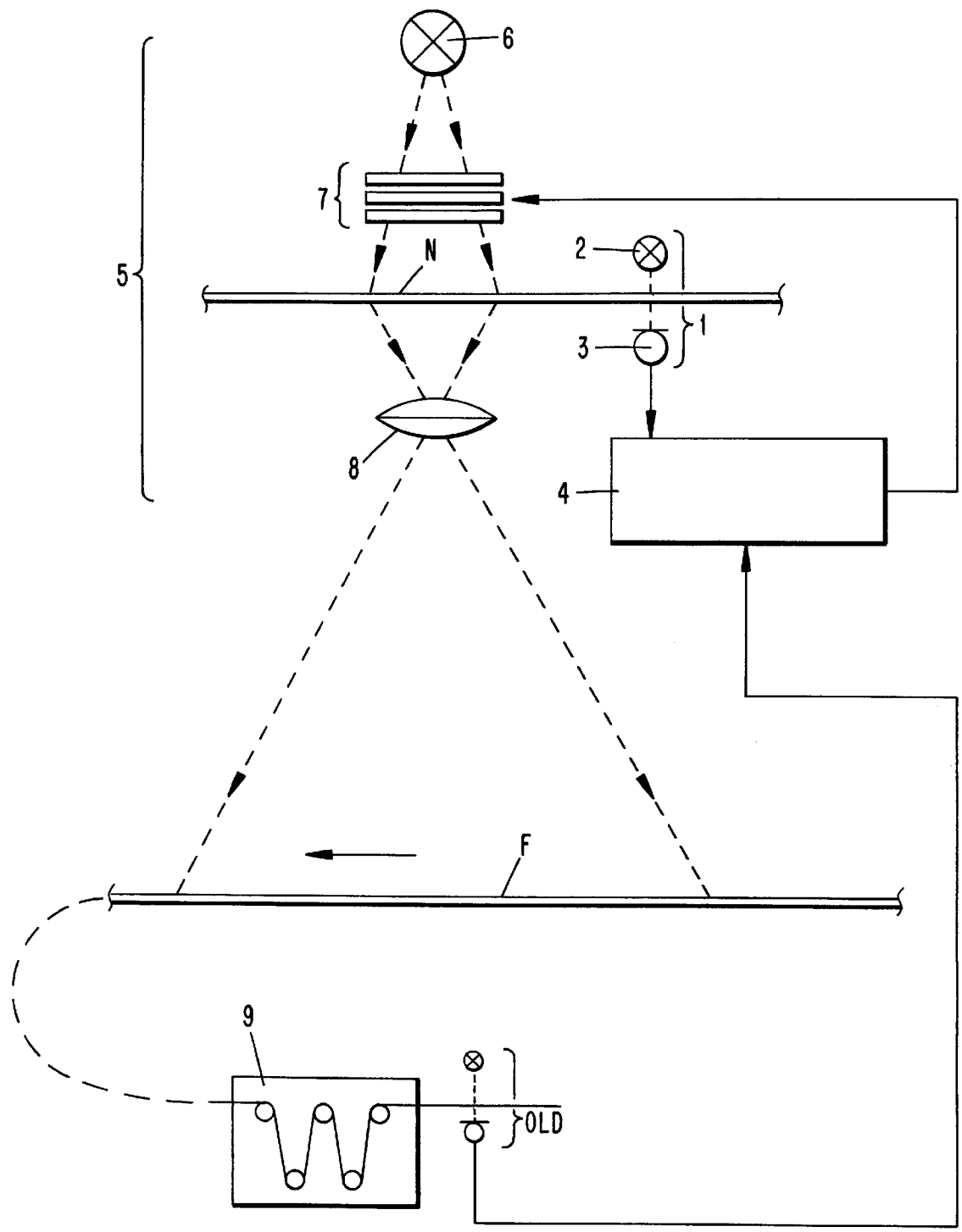
FIG. 1 is an exemplary arrangement of parts of a photographic copy printer and a downstream developing station for developing exposed photographic paper.

FIG. 1 shows parts of a photographic copy printer with a downstream paper processor 9 for understanding an exemplary method of the present invention. The FIG. 1 arrangement includes a measuring station 1, in which an original to be copied, such as a negative film N, is scanned regionally, (such as dotwise) by means of a measurement light source 2 and a detector array 3. The light transmitted through the negative film N, which hereinafter should always be considered as representative for an original, is broken down spectrally by the detector array 3 and converted into wavelength- and intensity-dependent electrical measurement signals. Next, these electrical measurement signals are digitized and converted into measurement data, which are specific for the particular negative. This digitizing and conversion can be done either in the detector array 3 or in the downstream computation and control unit 4. On the basis of these measurement data, the amounts of copying light required to copy this negative onto copy material are ascertained by the computation and control unit 4. Once the requisite amounts of copying light have been determined, the computation and control unit 4 generates corresponding control signals, which are used to control color shutters 7, provided in the downstream copying station 5. Those skilled in the art will appreciate that other known methods for controlling the exposure in the three colors can also be used.

In copying station 5, the actual copying of the respective negative onto the copy material, which is here represented by photo paper F, is performed. The copying of the negatives onto photo paper is done in this example such that the color shutters 7 are swiveled into the beam path of the copying light source 6 in accordance with the control signals generated in the computation and control unit 4. By means of a projecting optical element 8, the corresponding negative is projected onto the photo paper F. The exposed photo paper is now developed, in a paper processor 9. This paper processor can be a component of a complete photographic processing line, but can also be an independent unit.

The arrangement of FIG. 1—typically a copy printer—is setup-tested—calibrated—before production begins, or in other words, at the time the adjustable parameters of the copy printer are set by the operating staff. After a subjective assessment of developed paper pictures have been made from test negatives, the setup-testing or calibration—(optimization of the models) according to the invention can take place automatically, because the developed paper pictures are measured "on-line" at the outlet of the paper processor 9. The measurement data are used to optimize the parameters of the individual models. The corresponding measurement data of the associated negatives are known even before the negatives are measured. It is thus possible not only to preclude subjective influences in the setup testing (calibration), but is it also possible during production—either by taking random samples or continuously—to measure characteristic regions of the paper pictures automatically and to check or optimize the individual models quasi-"on-line", or in other words during production.

To that end, at the outlet of the paper processor 9 with the aid of an "on-line densitometer" OLD (measuring the photo paper involves remission measurements), the developed paper pictures on the photo paper are scanned regionally (for example, dotwise). The measurement light remitted by each scanned region of the photo paper is delivered to a detector array, broken down spectrally, and converted into wavelength- and intensity- dependent electrical measurement signals in, for example, a way similar to that used in measuring the negatives. In the case of phototransparent copy material, transmission measurements can also be used. These electrical measurement signals are digitized and with their aid copy-specific measurement data are ascertained. On the basis of these copy-specific measurement data, the model of the original adapted to the copy material, and the model for the copy material or the inverse model are checked with respect to specifiable accuracy criteria and updated as needed. One example for such accuracy criteria and for the individual models will be considered hereinafter in somewhat more detail.

Figure 2:
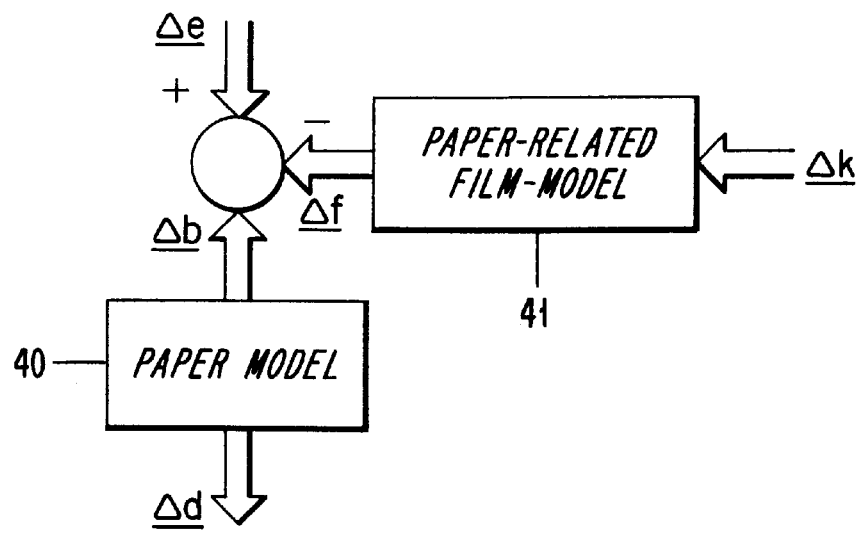
FIG. 2 is an overview to illustrate cooperation of the paper-related film model in a paper model.

To that end, FIG. 2 shows how the entire exposure system is modeled. For this purpose a complete model is used that itself encompasses two models, namely a paper model 40 and a paper-related film model 41. The paper model 40 essentially represents how the paper density (via the concentration of the pigments yellow, magenta, cyan) changes as a function of a change of the copying light in the three colors blue, green, red. In other words, the paper model is representative of the absorption properties of the photo paper if the exposure changes. The paper model can take into account secondary absorptions of the photo paper as well; for example, if the photo paper is acted upon by blue light, this causes a change in the optical density of all three colors.

The paper-related film model 41, conversely, represents how the photo paper reacts to changes in the spectral film density (with the copying light unchanged) and thus also indicates how the copying light must be changed in order to compensate for deviations of the actually measured density of a negative from the average film density. To that end, however, the film must be looked at "with the eyes of the photo paper", which is why one uses the term paper-related film model.

For the sake of better comprehension of the variables in FIG. 2, it will be noted that the copying light can generally be characterized by its blue, green and red components, which are reproduced in a vector $$\underline{e} = \underline{e}_0 + \underline{\Delta e} = \begin{pmatrix} e_B \\ e_G \\ e_R \end{pmatrix}$$

(B, G, R=blue, green, red).

In the formula, e stands for the respective copying light vector, which is composed of one copying light vector $e_0$, which is a copying light vector with which a negative of average density is copied correctly onto the photo paper, and one copying light vector $\Delta e$, which represents the deviations from the average copying light vector $e_0$.

To copy the average negative "correctly", the photo paper, after the copying, has the reference density $d_0$, which is to be attained when an average negative is copied.

The paper density values are generally likewise characterized by a corresponding density vector $$\underline{d} = \underline{d}_0 + \underline{\Delta d} = \begin{pmatrix} d_Y \\ d_M \\ d_C \end{pmatrix}$$

(Y, M, C=yellow, magenta, cyan), and the vector $\Delta d$ stands for the deviations of the actual paper density from the desired paper, or reference density, $d_0$.

If a negative film is placed in the exposure beam path (copying light), then the effective exposure "b" for the three color layers in the photo paper is reduced. This exposure reduction is described in vector terms by:

$$b=e-f,$$

where the vector f stands for the density of the negative and results from the formula $$\underline{f} = \underline{f}_0 + \underline{\Delta f} = \begin{pmatrix} f_B \\ f_G \\ f_R \end{pmatrix}$$

(B, G, R=blue, green, red).

Here, $f_0$ stands for the density vector of an average negative, and the vector $\Delta f$ stands for deviations from this average density. Beginning in the basic state (copying light vector $e_0$ and negative film density $f_0$; result: paper density $d_0$), it is possible with the aid of the complete model shown in FIG. 2 to predict the influence of changes in the copying light (vector $\Delta e$) and the film density (vector $\Delta f$ on the paper density (vector $\Delta d$). This prediction (and the prediction of the correction that might be needed) naturally improves, as the individual models (paper model, paper-related film model) better replicate actual conditions.

Figure 3:
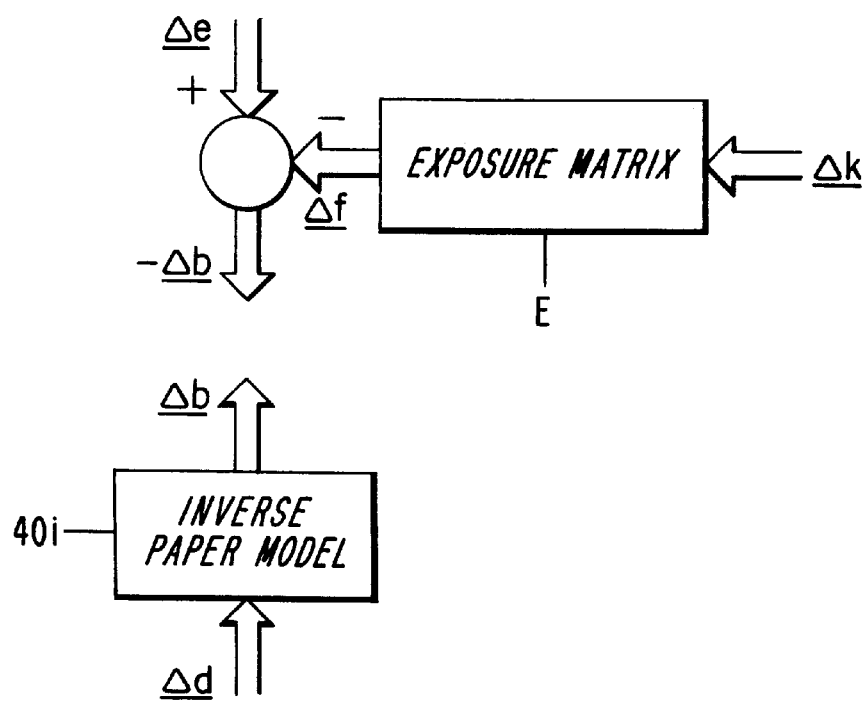
FIG. 3 is an exemplary procedure for optimizing the paper-related film model.

In conjunction with FIG. 3, the paper-related film model will first be generally considered in somewhat more detail, but also the procedure of optimizing the paper-related film model will be observed in somewhat more detail. The paper-related film model 41 of FIG. 2 is realized in FIG. 3 by an exposure matrix E. Such an exposure matrix E is known (for instance from EP-A 0 475 897) to be a sufficiently accurate realization of the paper-related film model. However, in order to be able to understand how one arrives at the input vector $\Delta k$, with which the exposure matrix E is linked, some preliminary observations are needed.

In the dotwise scanning of the negative in the measurement station 1 (FIG. 1), spectral transmissions (or in the case of a remission measurement, spectral remissions) are first determined for each measurement point. To that end, the light emitted by the measurement light source 2 and transmitted through the measurement point of the negative is converted by the respective detector of the detector array 3 into a corresponding electrical measurement signal, which corresponds to the transmission of the negative at a predetermined wavelength. These transmission values are logarithmically converted into spectral density values and are compared with a corresponding reference density, for example of a neutral gray standard original. These spectral density differences are then subjected to a transformation, such as the Karhunen-Loève transformation. Using a certain criteria such as that described in European Patent Document No. EP-A 0 475 897, the disclosure of which is hereby incorporated by reference in its entirety, a number of transmission coefficients, (such as seven) which are accurately representative for the spectral density distribution of the original, are selected. These seven transformation coefficients are represented in a vector $\Delta k$ and form the input variable in the diagram in FIG. 3, which is linked with the exposure matrix by the equation:

$$\Delta f = E \Delta k \text{(E=exposure matrix)},$$

to obtain the respective film density vector $\Delta f$, which is a measure of the deviation of the density of the respective negative of the film from the average film density $f_0$. It is clear that in the case of seven transformation coefficients of the vector $\Delta k$, the matrix E is a 3×7 matrix, if—as described above—the vector $\Delta f$ includes three components.

As those skilled in the art will appreciate the densities of the original in the three basic colors red, green, blue can also be used as the input variable and linked with the exposure matrix E in accordance with the above equation. In that case, the exposure matrix E is a 3×3 matrix.

In optimizing the exposure matrix E, the point of departure is a known paper model 40 (such as the current paper model at the time). If the paper model 40 is known (typically in the form of an invertible paper matrix, if a linear model is sufficiently accurate), then the "inverse paper model" 40i (in that case, also a matrix) can also be ascertained. Either a number N of homogeneous but differently exposed test negatives, which accordingly each have different Karhunen-Loève transformation vectors $\Delta k_N$ (hereinafter called KL transformation vectors), are copied onto the photo paper with specified copying light deviations $\Delta e_N$, and the density deviations $\Delta d_N$ of the paper pictures are measured with the aid of the on-line densitometer OLD. Alternately, production negatives (that is, negatives to be copied) can be used directly for this optimization.

Figure 8:
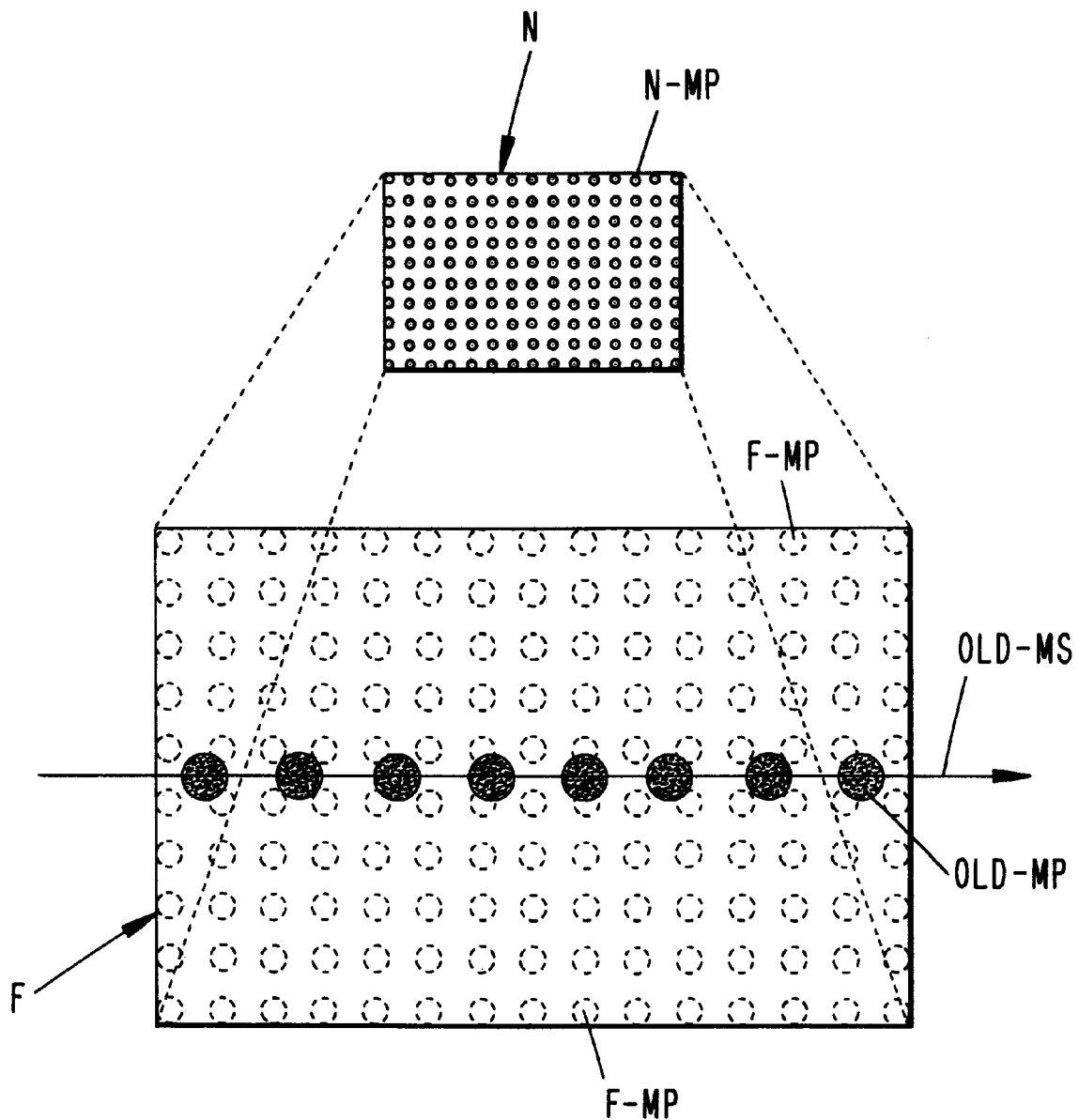
FIG. 8 illustrates an original to be copied and a copy made from it, to explain an exemplary procedure for optimizing the models using production copies.

If test negatives are used, then the copying light deviations $\Delta e_N$ are logically chosen such that approximately identical gray copies are produced. Conversely, if production negatives are used, then one may proceed, for example in the way explained hereinafter in conjunction with FIG. 8. To that end, in FIG. 8 a negative of a negative film strip N and a copy of it made on photo paper F are shown. The individual negative measurement points N-MP are indicated on the negative (in reality, the resolution is much finer, but it would be difficult to show this in the drawing), and the projections F-MP of the negative measuring points are shown on the copy made of it on the photo paper F. A measurement track OLD-MS of the on-line densitometer OLD (FIG. 1) is also shown (the measurement track OLD-MS shown extends straight in the longitudinal center of the photo paper F, but some other measurement track could equally well be selected), along with some measurement points OLD-MP along this measurement track OLD-MS. In a copy printer, the resolution of the measurement point on the negative and on the paper picture as well as the enlargement used in copying are known. Also known is which point of the negative is being projected onto the center of the paper picture. Hence an unambiguous association can be made, and for each measurement point OLD-MP on the paper picture, a number (such as four) of measurement points N-MP on the negative that are closest to the calculated measurement point can be ascertained.

If the measurement point OLD-MP on the left edge of the paper picture is taken as an example, then the four measurement points N-MP on the negative that are being considered are those that—viewed from the left—correspond to the first two projections F-MP in the first line above and the first line below the measurement track OLD-MS of the on-line densitometer OLD (FIG. 1). The respective measurement data (film density, paper density, copying light and the associated film type) are stored in memory for later evaluation. Before a series of measurement data is then evaluated, a check is made as to whether the series of data originates in more than a minimum number of different film types (for instance, more than 10 different film types). It is also checked whether the region encompassed by the measurement data in terms of color and density is sufficiently large, both for the film densities (for ascertaining the paper-related film model) and for the paper densities (for ascertaining the paper model). If individual film types in terms of their numbers occur too often in the series of data, then only some of the measurement data for this film type are used for the evaluation.

To be able to begin the model optimization, approximation values for the parameters of the model must be known for at least one of the models. For the exposure matrix E, a good approximation value can be determined as follows. It is assumed that the spectral sensitivities of the photo paper are concentrated at three discrete wavelengths; for example, $\lambda_B = 470$ nm, $\lambda_G = 550$ nm and $\lambda_R \approx 690$ nm. The three components of the film density vector f, on this assumption, correspond precisely to the values for the spectral film density that have been measured at precisely these wavelengths. On the other hand, the spectral film densities can be calculated directly with a very good approximation, using the inverse Karhunen-Loève transformation, from the KL transformation vector $\Delta k$ (which was determined not only from the spectral film density values at precisely the three wavelengths cited but also from the spectral film density at the other wavelengths). Thus by way of the aforementioned equation:

$$\Delta f = E \Delta k,$$

a first approximation value for the exposure matrix E is known.

Figure 7:
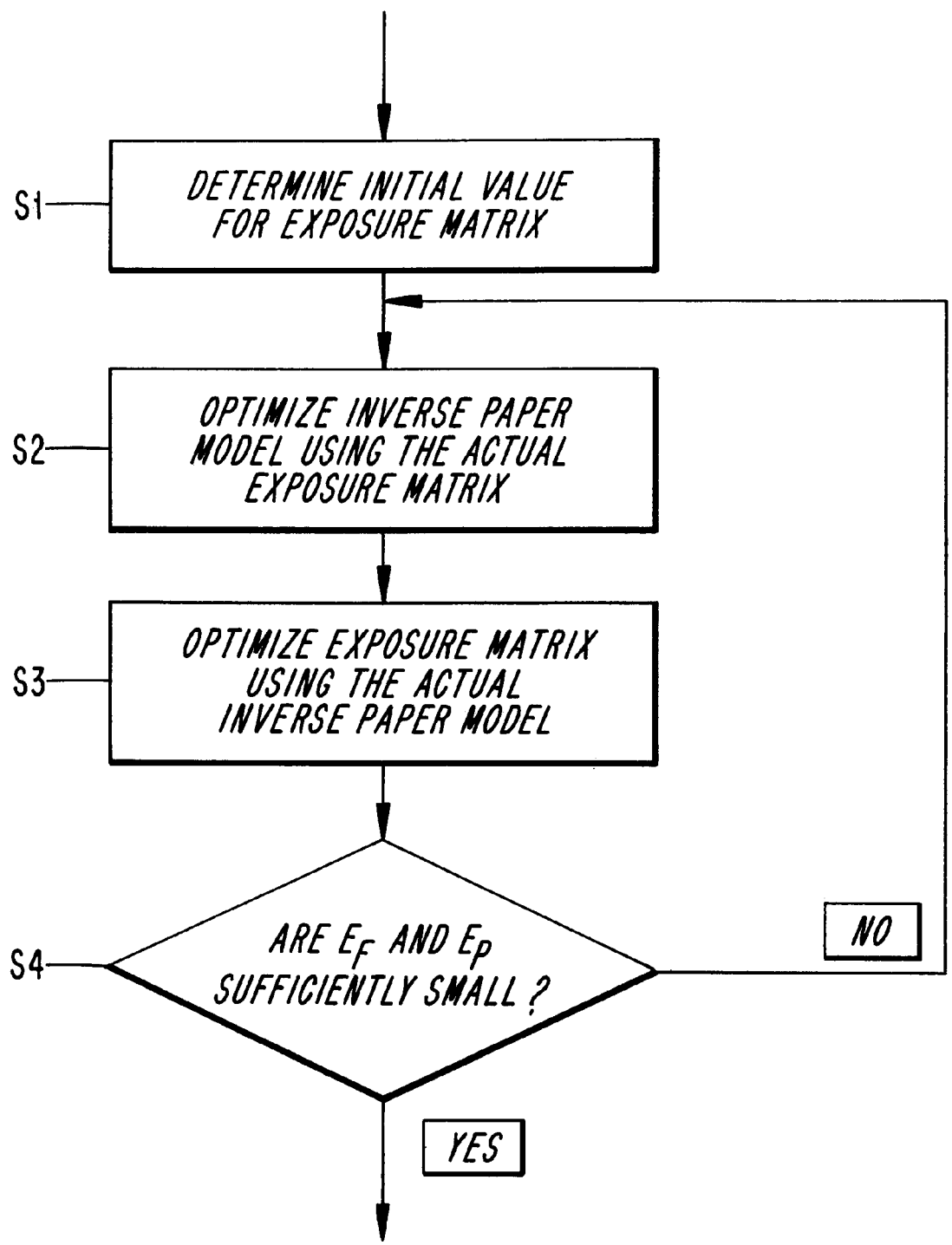
FIG. 7 illustrates an exemplary procedure for optimizing both models.

If no starting values are available for the models, the method still leads to success if one proceeds as shown in FIG. 7. In accordance with the flow chart shown there for the optimization of the complete model, in a first step S1 a starting value for the exposure matrix E is determined. This can be done in the way described earlier herein (on the assumption that the spectral paper sensitivities are concentrated on three discrete wavelengths, and so forth). Then in a second step S2, the inverse paper model is optimized, as described above in detail, using the current exposure matrix (at the beginning, this is the starting value for the exposure matrix). The exposure matrix remains unchanged in this process. Once the inverse paper model has been optimized, then in a step S3 the exposure matrix is optimized. In this process, the current inverse paper model (that is, the one optimized previously in step S2) is used, and it remains unchanged in the optimization of the exposure matrix. Next, in a step S4, it is checked whether specified errors $E_F$ and $E_P$ are small enough or in other words undershoot a threshold value (that is, whether the specifiable demands for accuracy of the models have been met). If not, then the exposure matrix optimized beforehand in step S3 is used, and the inverse paper model is optimized again, and so forth. This loop is continued until the models meet the accuracy requirements (that is, until the errors EF and Ep are small enough), or until further iteration brings no further improvement.

The optimization of the exposure matrix in accordance with FIG. 3 is now done, with the inverse paper model known and unchanged in the optimization of the exposure matrix, as follows: First, the paper densities $\Delta d_N$, for the pictures copied onto photo paper, of the N homogeneous test negatives (in the case where homogeneous test negatives are used), or the paper densities of the copied pictures, are measured at the selected measurement points with the aid of the densitometer OLD. With the aid of the inverse paper model 40$i$, the exposure deviations $\Delta b_N$, which have caused the changes in the paper density, are then determined. The vector $\Delta k_N$ of the respective test negative or of the production negative, respectively, is known from the spectral measuring of the negative or is ascertained therefrom. The vector $\Delta e_N$ for the copying light that was used in copying the respective test negative or production negative is also known. Now, by means of a mathematical optimization process, the matrix E for which the error becomes minimal is calculated as follows:

$$E_F = 1/N\Sigma |\Delta b_N - \Delta b_N|^2 = 1/N\Sigma |\Delta b_N + \Delta e_N - E\Delta k_N|^2$$

Since the paper-related film model is a linear model, then the known method of "multilinear regression" can be used as the optimizing method.

Figure 4:
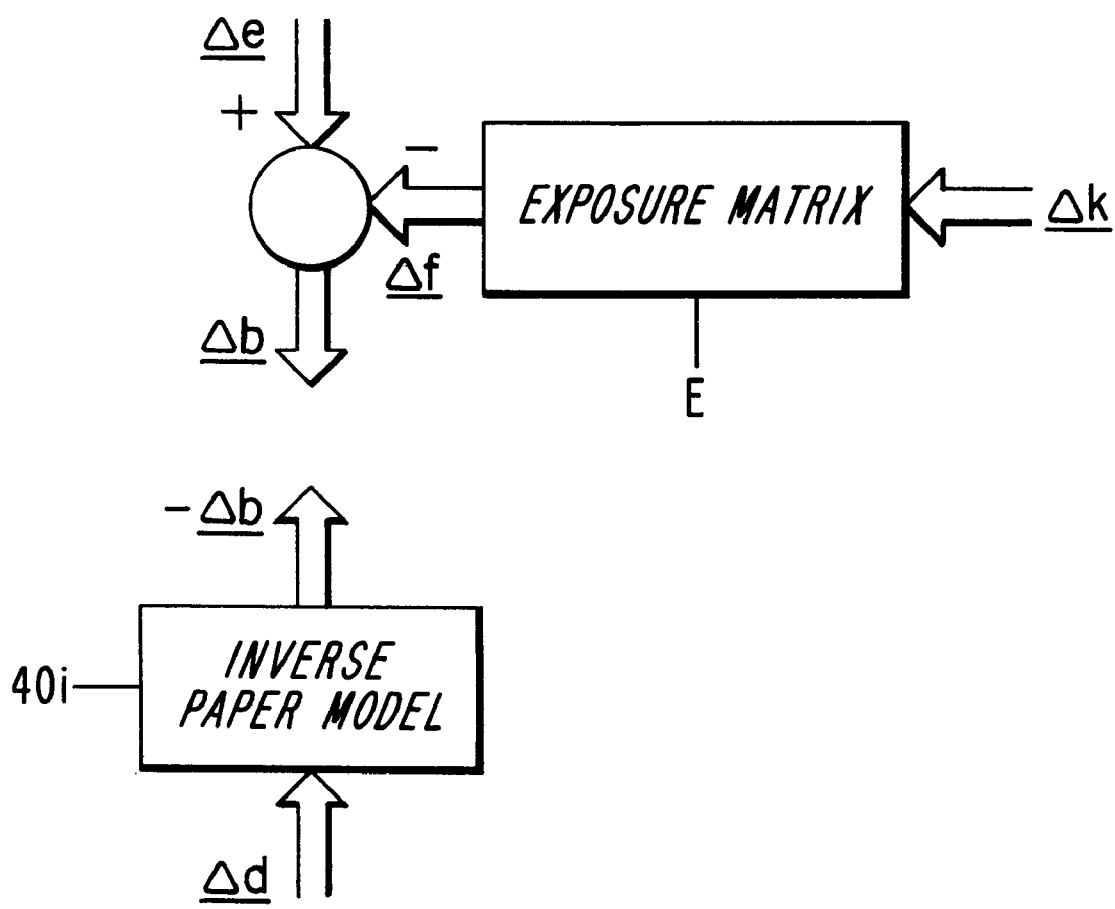
FIG. 4 is an exemplary procedure for optimizing the paper model or the inverse paper model.

For many applications, it also suffices to use a linear principle for the paper model 40 (FIG. 2) as well. In such cases, the paper model 40 can be reproduced by a corresponding paper matrix. The range of validity of this kind of linear model is limited, however, to a certain area surrounding the operating point on the characteristic curve for the particular pigment. A more-accurate model, conversely, also takes into account the nonlinearity of the characteristic curves. Before the optimization of the paper model 40, or the optimization of the inverse paper model 40$i$, is described in conjunction with FIG. 4, the nonlinearity of the characteristic curves should first be considered in somewhat more detail.

Figure 5:
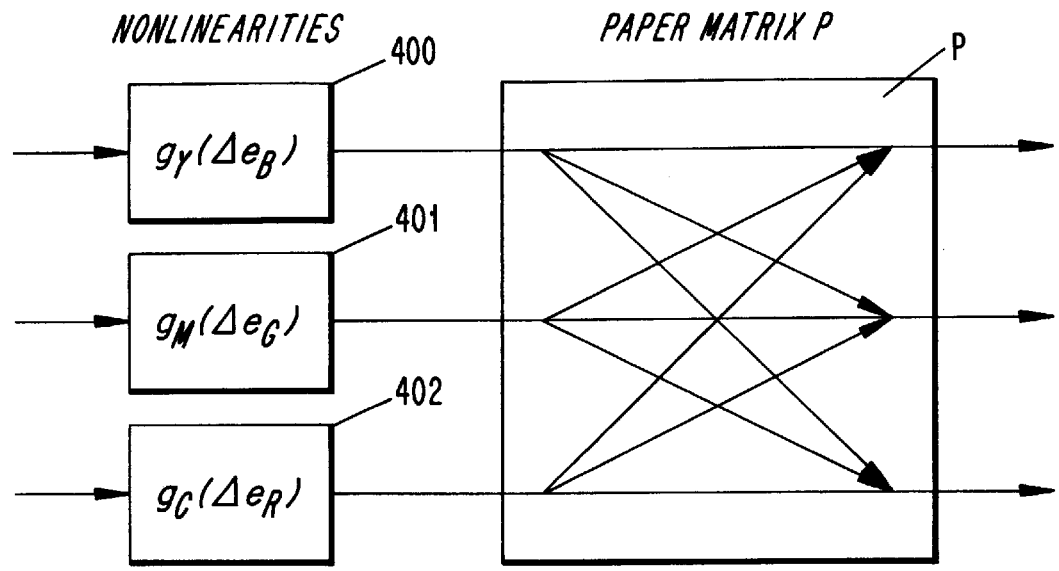
FIG. 5 is a more-detailed view of a paper model.
Figure 6:
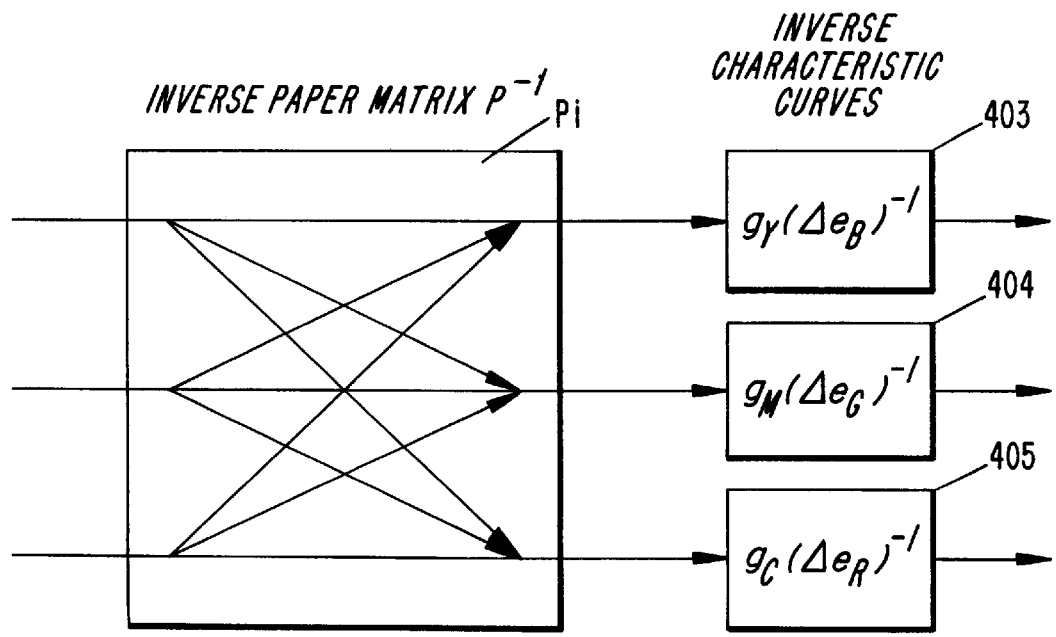
FIG. 6 is a more-detailed view of an inverse paper model.

To that end, in FIG. 5 the photo paper is modeled in such a way that initially three channels 400, 401 and 402 are provided, which reproduce the nonlinear change in concentration of the pigments yellow (Y), magenta (M) and cyan (C), as a function of the respective change in exposure in blue ($\Delta e_B$), green ($\Delta e_G$) and red ($\Delta e_R$), specifically in the form of dependencies $g_Y$ ($\Delta e_B$), $g_M$ ($\Delta e_G$) and $g_C$ ($\Delta e_R$). Following this, a linear model—a paper matrix P—is provided, which takes into account the fact that upon a change of exposure in only the blue light, for instance, changes in the optical density in all three colors are brought about. Actually, however, it is not the paper model but the inverse paper model, as shown in FIG. 6, that is optimized. The—likewise nonlinear—inverse characteristic curves, which are represented in channels 403, 404, 405 by $g_Y$ ($\Delta e_B$)$^{-1}$, $g_M$ ($\Delta e_G$)$^{-1}$ and $g_C$ ($\Delta e_R$)$^{-1}$, can for instance be expressed in the form of power series. The coefficients of these power series, together with the coefficients of the inverse paper matrix Pi, then represent the optimizing parameters of the model. However, here—unlike the paper—related film model (the exposure matrix)—the paper model involves a nonlinear model. The optimization of this inverse paper model 40$i$ (FIG. 4) can then proceed as follows.

A number N of homogeneous but differently exposed test negatives, or production negatives, are copied with KL transformation vectors $\Delta k_N$ at specified copying light deviations $\Delta e_N$ and the resultant density deviations $\Delta d_N$ of the associated paper pictures (copies) are measured using the on-line densitometer OLD (FIG. 1). In principle—if test negatives are used—it is also possible to use only a single test negative and to subject it to different copying light deviations $\Delta e_N$. Instead of a negative, a color filter can also be used, whose spectral density is approximately equivalent to a normal negative. The copying light deviations $\Delta e_N$ are selected such that the resultant paper density deviations $\Delta d_N$ cover the entire range over which the model is intended to be valid. The exposure matrix E remains unchanged in the optimization of the inverse paper model. Once the copying light vectors $\Delta k_N$, the exposure matrix E and the copying light deviations $\Delta e_N$ used are known, the exposure deviations $\Delta b_N$ that have caused the measured paper density deviations $\Delta d_N$ can be determined. By means of a mathematical optimization process, the parameters of the inverse paper model for which the error becomes minimal are now determined as follows:

$$E_P = 1/N\Sigma |\Delta b_N - \Delta b_N|^2 = 1/N\Sigma |\Delta b_N - \Delta e_N + E\Delta k_N|^2$$

Since—as already noted above—the inverse paper model is a nonlinear model, an iterative method can be used for the nonlinear optimization (see for instance R. Fletcher: "Practical Methods of Optimization", Vols. 1+2, John Wiley & Sons).

The above description of the optimization process for the exposure matrix, or in other words for the paper-related film model 41, and for the inverse paper model 40i has been based on the assumption that in each case the other one of the two models is known. Moreover, the other model is unchanged in the optimization. If no starting values are available for the models, the method still leads to success if one proceeds as shown in FIG. 7 and as described earlier herein (on reaching specified accuracy criteria, the optimization is discontinued, or if the optimization brings no further improvement it is again discontinued).

This optimization of the models on the basis of the paper pictures measured with the on-line densitometer OLD has the advantage that the setup testing—calibration—of the equipment can be done fully automatically and entirely independently of the subjective assessment of the operating staff, both if (homogeneous) test negatives are used and directly with the aid of production negatives, which is especially of interest for use in the minilab field. Moreover, it is possible at any time during ongoing production to monitor or check the models in terms of characteristic regions of the (production) negatives and the associated (production) paper pictures. With the aid of these measurement data, the models can also be updated (tracked) on-line, or in other words during the production process.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for calibrating a photographic copy printer, comprising the steps of:
    a) regionally scanning an original to be copied, in a measuring station of the copy printer;
    b) supplying measured light received from each scanned region of the copying original to a detector array, breaking down said measured light spectrally, and converting said measured light into wavelength- and intensity-dependent measurement data;
    c) digitizing the measurement data, and with their aid, ascertaining original-specific measurement data;
    d) on the basis of the measurement data, with the aid of a first model adapted to the copy material for the original to be copied, said first model being representative of copy material performance for changes in spectral composition of the original, and with the aid of a second model for the copy material, said second model being representative of absorption properties of the copy material for changes in exposure, ascertaining amounts of copying light required for incident exposure;
    e) on the basis of the ascertained amounts of copying light, ascertaining control signals for color filters and shutters provided in a copying station of the copy printer, said control signals being used to place said color filters and shutters in a copying beam path during copying of the original onto the copy material;
    f) developing copies of the originals on the copy material in a developing station;
    g) scanning the developed copies regionally;
    h) supplying measured light from each scanned region of the copy material to said detector array, breaking down said measured light spectrally, and converting said measured light from said copy material into wavelength- and intensity-dependent copy material measurement data;
    i) digitizing the copy material measurement data, and with their aid, ascertaining copy-specific measurement data; and
    j) on the basis of the copy-specific measurement data, the original-specific measurement data and said exposure, checking and optimizing the first and second models with respect to specifiable accuracy criteria.

2. The method of claim 1, wherein the developed copies are scanned at an outlet of the developing station.

3. The method of claim 2, wherein both the first model and the second model are optimized based on the copy-specific measurement data until a mean square error, as a criterion for accuracy for at least one of the first and second models, reaches a threshold value, the optimizing of the at least one model being effected such that the other model is unchanged in this optimization.

4. The method of claim 1 wherein the digitized measurement data is subjected to at least one of a reversible, orthogonal transformation and data compression, and the transformation coefficients resulting from this transformation being used as the input variable for the first model.

5. The method of claim 1, wherein a starting value for the first model is determined and then based on the copy-specific measurement data, the original-specific measurement data, and the exposure, the first model is optimized until a mean square error reaches a threshold value; and then with an optimized first model, the second model is optimized based on the copy-specific measurement data, the original-specific measurement data, and the exposure until a mean square error reaches a second threshold value.

6. The method of claim 1, wherein said step of regionally scanning the original and said step of scanning the developed copies are performed dotwise.

7. The method of claim 1, wherein said measured light is transmitted by each scanning region of the original and of the copy material.

8. The method of claim 1, wherein said measured light is remitted by each scanned region of the original and of the copy material.

9. The method of claim 1, wherein said second model is an inverse model representative of changes in exposure.

10. The method of claim 3, wherein said threshold value is a minimized mean square error.

11. The method of claim 3, wherein said threshold value is a specified value.

12. The method of claim 4, wherein said transformation is the Karhunen-Loéve transformation.

13. The method of claim 1, wherein the calibration is performed by iteratively performing the functions of steps a) to j) to automatically optimize the first and second models.

* * * * *